(No Model.)
H. J. COE.
FERTILIZER DISTRIBUTING ATTACHMENT FOR LAND ROLLERS.
No. 510,408. Patented Dec. 12, 1893.
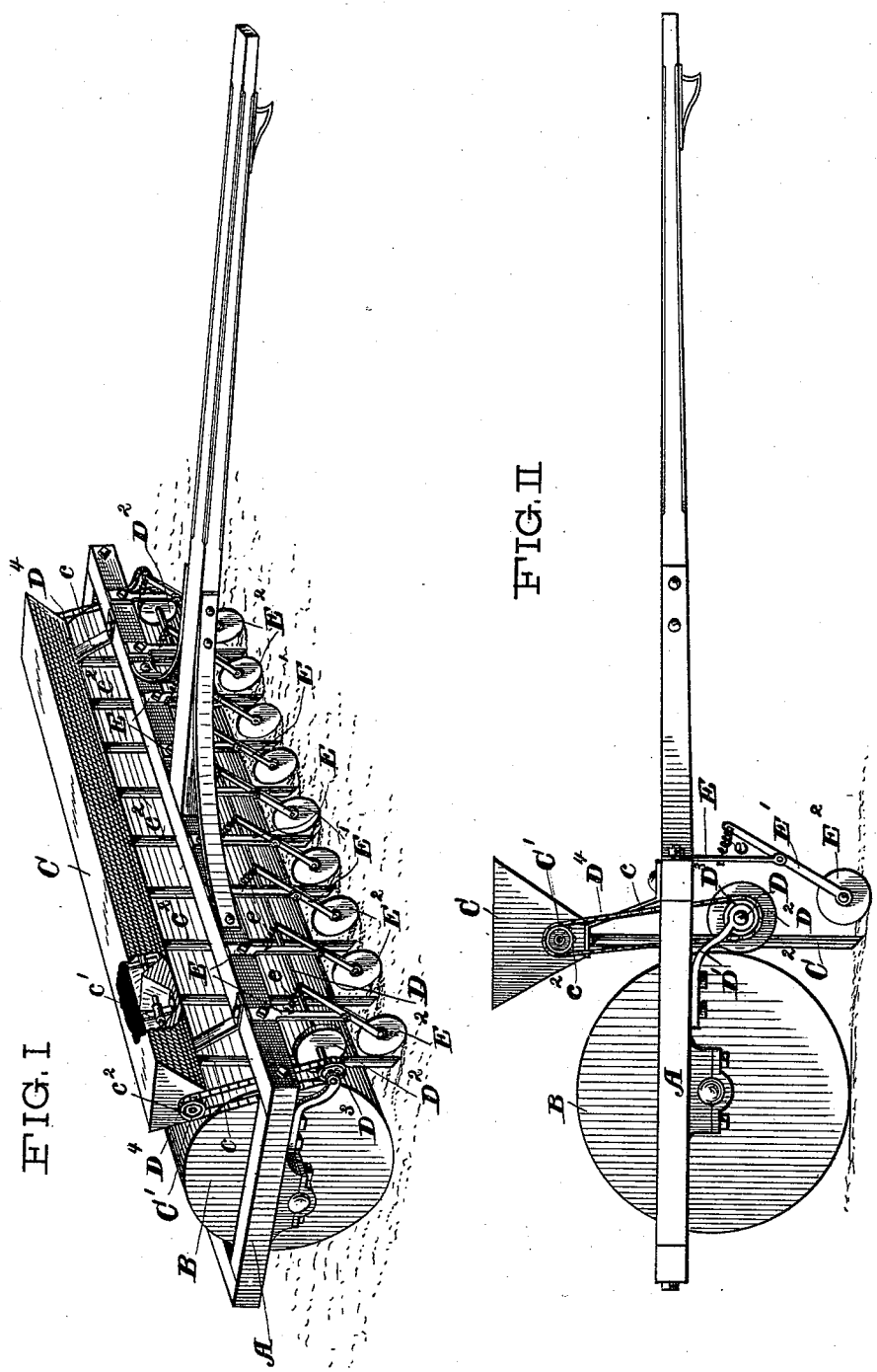
WITNESSES:
INVENTOR.

UNITED STATES PATENT OFFICE.

HENRY J. COE, OF CLEVELAND, OHIO.

FERTILIZER-DISTRIBUTING ATTACHMENT FOR LAND-ROLLERS.

SPECIFICATION forming part of Letters Patent No. 510,408, dated December 12, 1893.

Application filed February 16, 1893. Serial No. 462,575. (No model.)

*To all whom it may concern:*

Be it known that I, HENRY J. COE, a citizen of the United States, and a resident of Cleveland, county of Cuyahoga, and State of Ohio, have invented certain new and useful Improvements in Fertilizer-Distributing Attachments for Land-Rollers or other Wheeled Vehicles, of which the following is a specification, the principle of the invention being herein explained and the best mode in which I have contemplated applying that principle, so as to distinguish it from other inventions.

The annexed drawings and the following description set forth in detail, one mechanical form embodying the invention; such detail construction being but one of various mechanical forms in which the principle of the invention may be used.

In said annexed drawings—Figure I represents a perspective view of a land roller provided with my improved fertilizer distributer, and Fig. II a vertical section of the same.

When land has been in grass for a considerable space of time, and has either had the grass cut off and removed as hay, or has been grazed by cattle, the land is liable to become exhausted and to refuse to yield a suitable crop. In many instances it may then be inexpedient to plow the land and to either leave it fallow or to change the crop; and in such instances it is desirable to apply a fertilizer to the land. This may be done by scattering the fertilizer broad-cast over the surface of the land, but, in such case, a large percentage of the component elements of the fertilizer will be wasted by being washed away by rains, by becoming too dry, or by being retained in the surface of the soil out of reach of the plant roots. I have therefore devised an attachment for a land roller, or other wheeled vehicle, by means of which the fertilizer may be introduced beneath the surface of the soil and in such a manner that it will not disturb the permanent condition of the soil or interfere with the continued growth of the grass.

To the frame, A, of an ordinary land roller, B, of any suitable construction, I secure a hopper, C, for containing the fertilizer. Said hopper is suitably supported upon brackets, $c$, and has a shaft, $C'$, journaled within its bottom and provided with suitable stirrers, $c'$, which latter may stir the fertilizer and assist in feeding the same into tubes, $C^2$, extending from the bottom of the hopper, down in front of the roller, being suitably formed to deposit the fertilizer into furrows opened ahead of them. A shaft, D, is journaled in brackets, $D'$, extending from the roller frame, and has friction disks, $D^2$, upon it, which disks may have frictional contact with and be revolved by the roller, being held in such contact by their weight or by other means. One or more pulleys, $D^3$, are secured upon this shaft and have belts, $D^4$, passing around them and around pulleys, $c^2$, upon the stirrer shaft, so that the latter may be revolved by the revolving roller. Hangers, E, are secured to the frame, one in front of each fertilizer tube, and have levers, $E'$, pivoted in them, said levers being pivoted to swing in vertical planes transverse to the axis of the roller. Sharp-edged furrow-opening disks, $E^2$, are journaled in the lower, rearwardly inclined arms of said levers, and springs, $e$, are secured to the ends of the upper, forwardly inclined arms of the lever, and to the hangers; said springs serving to allow the furrow-opening disks to yield to obstacles in their path, and to force the disks through the surface of the soil. When the roller, with its attachment, is drawn over the ground, the disks will open furrows in the soil, the tubes will drop the fertilizer into the furrows, and the roller will again close the furrows, leaving the soil fertilized but with an undisturbed surface.

If desired, grass seed may be sown with the fertilizer, or in the place of the same.

The attachment may be easily removed from the roller frame, and the roller may be used for its ordinary purposes.

Any suitable furrow opener may be used in the place of the disk, although the disks may be the preferred form of furrow opener, and suitable means for adjusting the furrow openers, or for raising them out of operative position, may be provided.

Other means of applying the principle of my invention may be employed for the mode herein explained. Change may therefore be made as regards the mechanism herein set forth provided the principles of construction respectively recited in the following claims are employed.

I therefore particularly point out and distinctly claim as my invention—

1. The combination with a land roller or other wheeled vehicle, of a hopper having a stirrer, disks in frictional contact with the roller or wheel and connected to revolve said stirrer, tubes extending from the hopper in front of the roller or wheel, and furrow-opening disks journaled in front of said tubes, substantially as set forth.

2. The combination with a land roller or other wheeled vehicle, of a hopper having a stirrer, a shaft having friction disks in contact with the roller or wheel and connected to revolve the stirrer, tubes extending from the hopper down in front of the roller or wheel, and furrow-opening disks, yieldingly journaled in front of said tubes, substantially as set forth.

3. The combination with a land roller or other wheeled vehicle, of a hopper supported from the roller or vehicle frame, tubes extending down from said hopper in front of said roller or wheel, a stirrer shaft in said hopper provided with pulleys upon its ends, a shaft suitably journaled in supports from the roller or vehicle frame and provided with friction disks in contact with the roller or wheel and with pulleys upon its ends, belts around said pulleys and the pulleys upon the stirrer shaft, hangers secured upon the roller or vehicle frame in front of the tubes, levers fulcrumed in said hangers and having furrow-opening disks journaled in the ends of their lower, rearwardly inclined arms, and springs secured to the ends of the upper, forwardly inclined arms of said levers and to the hangers, substantially as set forth.

In testimony that I claim the foregoing to be my invention I have hereunto set my hand this 15th day of September, A. D. 1892.

HENRY J. COE.

Witnesses:
WM. SECHER,
J. B. FAY.